(12) United States Patent
Moeller (10) Patent No.: US 8,639,127 B2
(45) Date of Patent: *Jan. 28, 2014

(54) METHOD AND APPARATUS FOR IMPROVED JITTER TOLERANCE

(75) Inventor: Lothar Benedict Erhard Josef Moeller, Middletown, NJ (US)

(73) Assignee: Alcatel Lucent, Paris (FR)

( * ) Notice: Subject to any disclaimer, the term of this patent is extended or adjusted under 35 U.S.C. 154(b) by 1940 days.

This patent is subject to a terminal disclaimer.

(21) Appl. No.: 10/349,837

(22) Filed: Jan. 23, 2003

(65) Prior Publication Data

US 2003/0170022 A1    Sep. 11, 2003

Related U.S. Application Data

(60) Provisional application No. 60/362,113, filed on Mar. 6, 2002, provisional application No. 60/364,644, filed on Mar. 15, 2002.

(51) Int. Cl.
*H04B 10/00* (2013.01)

(52) U.S. Cl.
USPC .............................. 398/204; 398/202; 398/154

(58) Field of Classification Search
USPC ........................... 398/136, 154–155, 202–214
See application file for complete search history.

(56) References Cited

U.S. PATENT DOCUMENTS

| | | | | |
|---|---|---|---|---|
| 4,201,909 A * | 5/1980 | Dogliotti et al. | ............... | 398/189 |
| 4,606,023 A * | 8/1986 | Dragoo | ............... | 398/61 |
| 4,850,044 A * | 7/1989 | Block et al. | ............... | 398/118 |
| 5,610,947 A * | 3/1997 | Balasubramanian et al. | | 375/282 |
| 5,710,649 A * | 1/1998 | Mollenauer | ............... | 398/75 |
| 5,818,619 A * | 10/1998 | Medved et al. | ............... | 398/128 |
| 5,822,386 A * | 10/1998 | Pawelski | ............... | 375/373 |
| 5,850,189 A * | 12/1998 | Sakanaka et al. | ............ | 340/12.22 |
| 6,038,048 A * | 3/2000 | Harris et al. | ............... | 398/156 |
| 6,055,269 A * | 4/2000 | Drost et al. | ............... | 375/232 |
| 6,097,520 A * | 8/2000 | Kadnier | ............... | 398/106 |
| 6,226,296 B1* | 5/2001 | Lindsey et al. | ............... | 370/401 |
| 6,269,137 B1* | 7/2001 | Colella et al. | ............... | 375/355 |
| 6,347,128 B1* | 2/2002 | Ransijn | ............... | 375/376 |
| 6,356,386 B1* | 3/2002 | Denkin et al. | ............... | 359/337 |
| 6,373,911 B1* | 4/2002 | Tajima et al. | ............... | 375/375 |
| 6,463,109 B1* | 10/2002 | McCormack et al. | ........ | 375/355 |
| 6,480,313 B1* | 11/2002 | Kawamura | ............... | 398/173 |
| 6,650,844 B1* | 11/2003 | Davies et al. | ............... | 398/164 |
| 6,721,512 B1* | 4/2004 | Cao | ............... | 398/159 |
| 6,765,975 B2* | 7/2004 | Dunning et al. | ............... | 375/371 |
| 6,850,709 B1* | 2/2005 | Gfeller et al. | ............... | 398/118 |
| 6,898,379 B2* | 5/2005 | Lenosky et al. | ............... | 398/149 |
| 6,930,628 B2* | 8/2005 | Reinhold et al. | ............... | 341/155 |

(Continued)

OTHER PUBLICATIONS

Sang-Hyun Lee et al, IEEE International Solid-State Circuits Conference paper, "A 5 Gb/s .25 micro meter CMOS Jitter-Tolerant Variable Interval Oversampling Clock/Data Recovery Circuit, 2002".*

*Primary Examiner* — Agustin Bello
(74) *Attorney, Agent, or Firm* — Wall & Tong, LLP (57) ABSTRACT

We demonstrate a novel type of data receiver, which has superior performance compared to a standard receiver when an input signal is distorted by timing jitter. A method and apparatus for improved timing jitter tolerance includes sampling an input signal more than once within a bit slot of the input signal and determining, using logic circuitry, from a combination of at least a subset of the samples, a resulting logic state for an output signal.

22 Claims, 5 Drawing Sheets

(56) References Cited

U.S. PATENT DOCUMENTS

| | | | |
|---|---|---|---|
| 6,968,134 B1 * | 11/2005 | Wiesmann et al. | 398/183 |
| 7,079,778 B1 * | 7/2006 | Nelson et al. | 398/164 |
| 7,142,621 B2 * | 11/2006 | Vallet et al. | 375/355 |
| 7,307,569 B2 * | 12/2007 | Vrazel et al. | 341/144 |
| 7,330,669 B2 * | 2/2008 | Moeller | 398/204 |
| 7,613,402 B2 * | 11/2009 | Liu et al. | 398/202 |
| 7,643,761 B2 * | 1/2010 | Moeller et al. | 398/202 |
| 2002/0098795 A1 * | 7/2002 | Brede et al. | 455/3.01 |
| 2002/0176441 A1 * | 11/2002 | Swales et al. | 370/465 |
| 2003/0020985 A1 * | 1/2003 | LaGasse et al. | 359/135 |
| 2003/0048500 A1 * | 3/2003 | Fala et al. | 359/110 |
| 2003/0170022 A1 * | 9/2003 | Josef Moeller | 398/27 |
| 2004/0071247 A1 * | 4/2004 | Dunning et al. | 375/355 |
| 2005/0185969 A1 * | 8/2005 | Moeller et al. | 398/202 |
| 2005/0232644 A1 * | 10/2005 | Moeller | 398/202 |

* cited by examiner

METHOD AND APPARATUS FOR IMPROVED JITTER TOLERANCE

CROSS-REFERENCE TO RELATED APPLICATIONS

This patent application claims benefit of U.S. Provisional Patent Application No. 60/362,113 filed Mar. 6, 2002, which is herein incorporated by reference in its entirety. Furthermore, this patent application is related to U.S. Provisional Patent Application No. 60/364,644 filed Mar. 15, 2002, which is herein incorporated by reference in its entirety.

FIELD OF THE INVENTION

This invention relates to the field of optical transmission systems and, more specifically, to improving the jitter tolerance for receiving optical signals in optical transmission systems.

BACKGROUND OF THE INVENTION

A major limitation to the maximum reach of ultra-long haul on-off transmission systems, such as 10 Gb/s WDM transmission systems, is pulse timing jitter. Pulse timing jitter arises from inter-channel pulse collisions, which develop as a result of the chromatic dispersion of a fiber, resulting in a wavelength dependent signal propagation velocity. Other sources of timing jitter can be attributed to contributions from transmitter and receiver electronics, acoustic interaction effects, or especially, in the case of soliton transmission, to the Gordon-Haus effect.

Inter-channel pulse collisions occur when pulses of shorter wavelength channels, which have higher velocities than those of longer wavelength channels, overtake and pass through pulses in the longer wavelength channels. Since real data streams are substantially random, some pulses tend to experience more collisions and others experience fewer collisions in the course of traversing the system. The time displacements of the collisions, therefore, can result in considerable timing jitter.

The Gordon-Haus effect is caused by the interaction of soliton pulses with amplifier spontaneous emission (ASE) noise present along the transmission medium. J. P. Gordon et al. describe this effect in "Random Walk of Coherently Amplified Solitons in Optical Fiber Transmission," Optic Letters, 11(10), pp. 665-7 (1986). ASE noise randomly alters both the amplitude and carrier or channel frequency of propagating soliton pulses. The frequency shifts result in jitter in pulse arrival times. Pulse timing jitter can subsequently cause a soliton pulse to shift into the time interval reserved for a neighboring soliton pulse. The result, often known as intersymbol interference, culminates as an error in the received information.

The above described sources of timing jitter in optical signals propagating along a transmission system, as well as others, can create errors when attempting to receive the propagating optical signals. In conventional receivers, an optical pulse is sampled once within its bit slot. Because clock recovery circuits of conventional receivers cannot track fast timing jitter, the adjustment of an optimal pulse sampling point on every bit to attempt to minimize the receiving errors due to timing jitter is impossible. As such, timing jitter can cause an increase in the bit-error rate of an optical transmission system because of the shifting of the frequency of an optical pulse.

SUMMARY OF THE INVENTION

The present invention advantageously provides a novel type of data receiver, which has superior performance compared to a standard receiver when an input signal is distorted by timing jitter.

In one embodiment of the present invention, a method for improved timing jitter tolerance includes sampling an input signal more than once within a bit slot of the input signal and determining, using logic circuitry, from a combination of at least a subset of the samples, a resulting logic state for an output signal.

In an alternate embodiment of the present invention, a receiver for improved jitter tolerance includes a sampling circuit, for sampling an input signal more than once within a bit slot of the input signal, and logic circuitry, for determining a resulting logic state of an output signal from a combination of at least a subset of the more than one samples.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention advantageously provides a method and apparatus for improved jitter tolerance. Although the present invention will be described within the context of a single-channel 10 Gb/s return-to-zero (RZ) optical transmission system, it will be appreciated by those skilled in the art that within the teachings of the present invention, the inventive concept can be advantageously implemented in various other transmission systems wherein it is desirable to improve a jitter tolerance.

Figure 1:
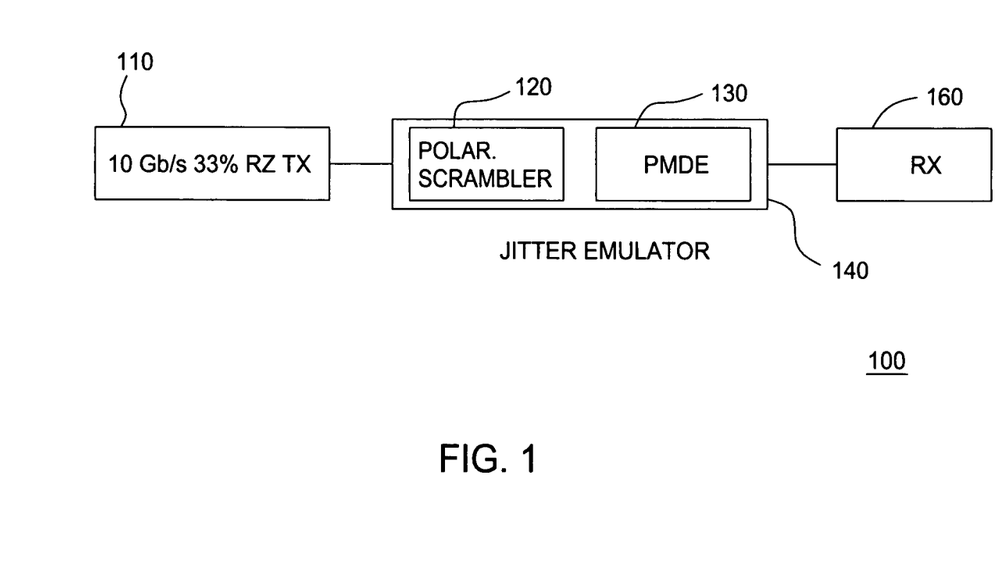
FIG. 1 depicts a high-level block diagram of a test setup of an optical transmission system including an embodiment of the present invention.

FIG. 1 depicts a high-level block diagram of a test setup of an optical transmission system including an embodiment of the present invention. The optical transmission test setup 100 of FIG. 1 provides an extreme case of pulse jitter during optical transmission to prove the principles of the present invention. The optical transmission test setup 100 of FIG. 1 comprises a transmitter (illustratively a 10 Gb/s 33% RZ transmitter) 110, a polarization scrambler 120 in front of a polarization mode dispersion (PMD) emulator 130 as a jitter emulator 140, and a receiver 160 in accordance with the present invention. The polarization scrambler 120 is used in front of the PMD emulator 130 as a jitter emulator 140 to keep the experiment free of side effects such as pulse broadening due to non-linear propagation, PMD and other non-jitter related pulse distortions. An optical signal's state of polarization changes in the μs range at the output of the polarization scrambler 120 is translated as timing jitter (arriving time fluctuations) by the receiver 160.

In the optical transmission test setup 100, a 10 Gb/s 33% RZ signal ($2^{31}-1$ PRBS) is generated using pulse carver techniques. The optical signal propagates through jitter emulator 140 and is received by the receiver 160. In the receiver 160, a clock recovery circuit (not shown) generates a sequence of optical pulses with a frequency related to a pulse frequency of the optical pulses received from the transmission fiber. That is, the clock recovery circuit monitors the data rate of the optical pulses generated by the transmitter 110 and adjusts the sampling time of the receiver 160 to correct for any variation in the data rate of the optical signal due to drift in the transmitter 110. As such, the input optical signals are sampled by the receiver 160 at a rate substantially equal to the data rate of the modulated optical signal.

Figure 2:
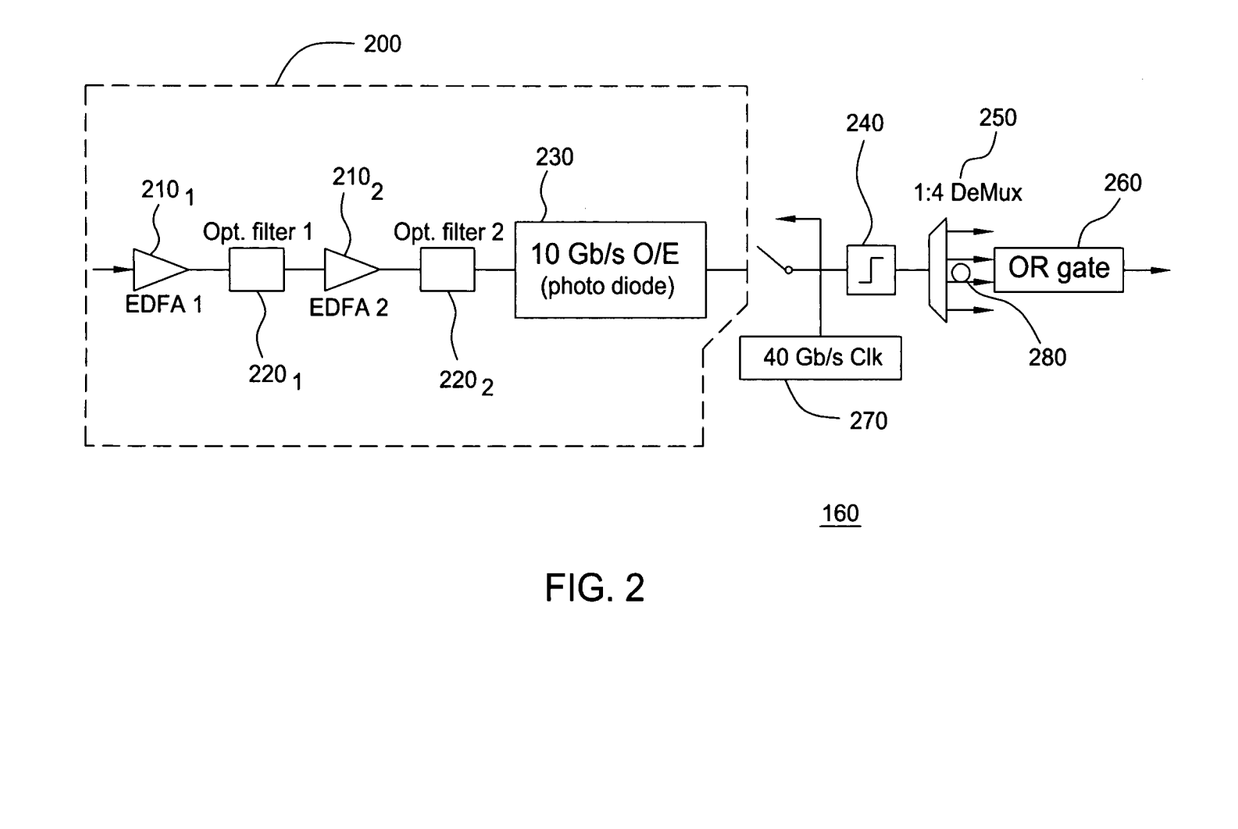
FIG. 2 depicts a high-level block diagram of an embodiment of a receiver suitable for use in the optical transmission test setup of FIG. 1.

FIG. 2 depicts a high-level block diagram of an embodiment of a receiver suitable for use in the optical transmission system of FIG. 1. The receiver 160 of FIG. 2 comprises a front-end pre-amplified receiver 200. The front-end pre-amplified receiver 200 comprises two erbium doped fiber amplifiers (EDFAs) $210_1$, $210_2$ (collectively EDFAs 210), two optical filters $220_1$, $220_2$ (collectively optical filters 220) and a 10 Gb/s lightwave (electro-optic) converter (illustratively a photodiode) 230. The receiver 160 further comprises a decision circuit 240, a 40 Gb/s 1:4 demultiplexer 250, and logic circuitry (illustratively an OR logic gate) 260. Although the front-end pre-amplified receiver 200 of FIG. 2 is depicted as a relatively complex receiver, a less complex conventional front-end pre-amplified receiver can also be implemented within various embodiments of the present invention. Additionally, although the logic circuitry 260 of FIG. 2 is depicted as an OR logic gate, other circuitry or devices that are able to determine a resulting logic state of at least one input signal can be implemented with the concepts of the present invention.

An optical signal from the optical transmission test setup 100 of FIG. 1 is received by the pre-amplified receiver 200 of the receiver 160, wherein the optical signal is converted into an electrical signal. The converted signal is applied to the decision circuit 240. The decision circuit 240 gives a low output power level (i.e., ideally this low level is a zero output power level) if the input power is below a predetermined threshold value and gives a high output power level (i.e., ideally this high level is a constant predetermined high output power level) if the input power is above the threshold value. The output of the decision circuit 240 is then sampled by the 40 Gb/s 1:4 demultiplexer 250. In the embodiment of FIG. 2, a 40 GHz clock 270 for the 40 Gb/s 1:4 demultiplexer 250 is generated by recovering the 10 GHz clock tone and using a 1:4 frequency multiplier (not shown). In other embodiments of the present invention, other sampling rates can be implemented in accordance with the present invention. The 40 Gb/s sampling rate depicted in FIG. 2 is merely exemplary and implemented because 40 Gb/s 1:4 demultiplexers are readily commercially available. Other demultiplexers, such as 1:2 demultiplexers, 1:3 demultiplexers, and 1:5 demultiplexers can also be implemented within the present invention.

In the embodiment of FIG. 2, the output signal from the decision circuit 240 is sampled four times within its bit period. The two adjacent center samples of the 40 Gb/s 1:4 demultiplexer 250 are coupled to the two inputs of the OR logic gate 260. The two center samples are preferably input into the OR logic gate 260 because the inventor determined that using the center adjacent samples will result in more accurate results. It will be appreciated by those skilled in the art that within the teachings of the present invention, other combinations of the four samples of the 40 Gb/s 1:4 demultiplexer 250 can be coupled to the two inputs of the OR logic gate 260. It will also be appreciated by those skilled in the art that within the teachings of the present invention, if other numbers of samples of the output signal from the decision circuit 240 are created, various combinations of those samples can be coupled to the two inputs of the OR logic gate 260.

In the receiver 160 of FIG. 2, the four samples of the output signal from the decision circuit 240 are separated by 25 ps (time delay). When the output of the decision circuit 240 is not a non-return-to-zero (NRZ) signal, the relative time delay between the two input signals to the OR logic gate 260 must be made substantially zero before entering the OR logic gate 260. This relative time delay must be made substantially zero because if a time delay or an offset between the two input signals entering the OR logic gate 260 is too large, the OR logic gate 260 may have difficulty capturing both pulses within the same time slot. To make the relative delay zero, a delay device (illustratively a tunable electrical delay line) 280 is added to an input of the OR logic gate 260 effectively increasing or decreasing the length of the propagation line to the OR logic gate 260 thus compensating for any relative delay between the two input signals to the OR logic gate 260. The decision of the OR logic gate 260 is then output from the receiver 160.

Figure 3:
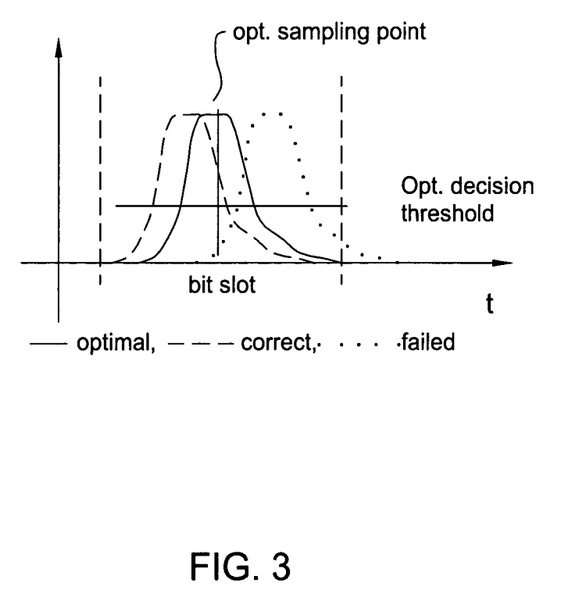
FIG. 3 graphically depicts an embodiment of a sampling method of a conventional receiver.

FIG. 3 graphically depicts a sampling method of a conventional receiver. In contrast to the receiver 160 of the present invention, a conventional receiver samples an input optical pulse at a specific sampling point. Although a clock recovery circuit can adjust the sampling point of an optical pulse within the bit slot for a particular pulse, the adjustment of the sampling point on every bit is impossible. Once the sample point is adjusted by the clock recovery circuit, the sample point is fixed.

Due to timing jitter, a pulse can arrive early or late compared to the sampling point. The late arrival of the pulse causes an increase in the bit-error rate (BER) of the received optical signals (assuming that the pulse is superposed with signal noise). If the pulse arrives early, the intensity of the pulse may significantly decreased at the sampling point, thus the BER will increase due to the relatively stronger impact of the signal noise. Only pulses, which arrive with their center substantially at the sampling point, or at least close to it, will show no enhanced error probability (EP) for the logical highs (ONEs). In a conventional receiver, the sample averaged bit error probability (BEP) is given by equation (1) as follows:

$$P_\Sigma = \frac{P_1 - P_0}{2} \qquad (1)$$

where $P_1$ and $P_0$ represent the EPs of the logical highs (ONEs) and the logical lows (ZEROs), respectively. For the cases of no timing jitter (no timing jitter present in a transmission system) the EPs of the logical ONEs and the logical ZEROs of a conventional receiver are typically in the range of $10^{-9}$. In the cases involving timing jitter (timing jitter present in a transmission system), the EP for the logical ONEs will dramatically increase. For example, the EP for the logical ONEs in a conventional receiver involving timing jitter is typically measured to be approximately $10^{-5}$, which corresponds to a penalty of substantially 2 dB. The EP for the logical ZEROs, however, remains substantially the same or is even slightly reduced as compared to the case with no timing jitter.

Figure 4:
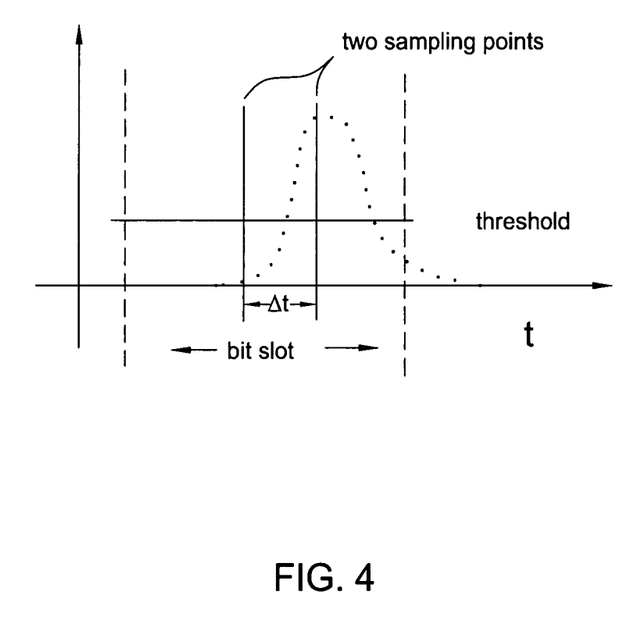
FIG. 4 graphically depicts an embodiment of a sampling method in accordance with the present invention.

By contrast, a receiver in accordance with the present invention advantageously provides a method for increasing a timing jitter tolerance of a receiver in an optical transmission system. FIG. 4 graphically depicts an embodiment of a sampling method of the receiver 160 in accordance with the present invention. An input optical signal is sampled at more than one point within its bit slot within a receiver in accordance with the present invention (i.e., receiver 160 of FIG. 2). When two or more sampling points per bit slot are collected and the decisions are combined by a logical OR operation, the EP for the logical highs (ONEs) is reduced because the likelihood of detecting an optical pulse within a bit slot increases when implementing multiple sampling points.

In the embodiment of FIG. 1 described above, the receiver 160 implements dual sampling (two sampling points per bit). For the case when the receiver 160 implements dual sampling and when timing jitter is present in an optical transmission system, the EP for the logical ONEs is drastically reduced. The sample averaged BEP for the receiver 160 is given by equation (2) as follows:

$$P_\Sigma = \frac{P_1^{JD} - 2P_o}{2} \quad (2)$$

where $P_1^{JD}$ and $2P_0$ represent the EPs of the logical highs (ONEs) and the logical lows (ZEROS), respectively, for the case of dual sampling in a transmission system having timing jitter. The inventor determined that the EP for the logical highs (ONEs), $P_1^{JD}$, of an optical pulse for the case of dual sampling in a transmission system containing jitter, is orders of magnitudes smaller than the EP for the logical highs, $P_1$, of an optical pulse in a conventional receiver implementing a single sampling technique ($P_1^{JD} \approx [P_1]^2$). The inventor further determined that the EP for the logical lows (ZEROs), $2P_0$, of an optical pulse for the case of dual sampling in a transmission system containing jitter, only increases slightly and does not have a significant negative effect on the EP of the received optical pulse. Additionally, to further optimize the improvement in jitter tolerance in accordance with the present invention, the predetermined threshold level of the decision circuit (i.e. the decision circuit 240 of the receiver 160) can be adjusted to lower the EP of the receiver. By adjusting the threshold level of the decision circuit 240, the determination of a logical high (ONE) and the logical low (ZERO) can be further controlled.

In an experiment, a 10 Gb/s 33% RZ is launched through a jitter emulator and detected by a pre-amplified receiver, whose optical front end has an optical and electrical bandwidth of approx. 0.3 nm and 10 GHz, respectively. The converted optical signal is sampled by a commercially available 40 Gb/s 1:4 DeMux. The two center outputs of the 40 Gb/s 1:4 DeMux were processed by an OR gate after the relative delay (25 ps) between the outputs was compensated by means of tunable delay lines. The 40 GHz clock for the DeMux was generated by recovering the 10 GHz clock tone and using a 1:4 frequency multiplier.

In order to keep the experiment free of side effects such as pulse broadening due to non-linear propagation, PMD and other non-jitter related pulse distortions, a polarization scrambler was used in front of a PMD emulator to emulate timing jitter instead of generating timing jitter by propagating an optical pulse through a WDM transmission line. The State of Polarization (SOP) of the optical pulse changes in the micro second (µs) range as the polarization scrambler's output is translated into arriving time fluctuations (jitter) at the receiver. It should be noted, though, that the timing jitter generated by the PMD emulator has a different characteristic in terms of statistical properties when compared to timing jitter generated in a transmission line, however, the important aspects of timing jitter, which are, for this purpose, when the pulse center arrives with a time offset with respect to the sampling point in a receiver, are well reproduced by the PMD emulator.

For substantially small timing jitter offsets (DGD of the emulator), the single sampling of a conventional receiver and the dual sampling method of the present invention both produce substantially similar performances. When larger amounts of timing jitter offset (DGD) are applied, the dual (or multiple) sampling method of the present invention significantly outperforms single sampling.

Figure 5:
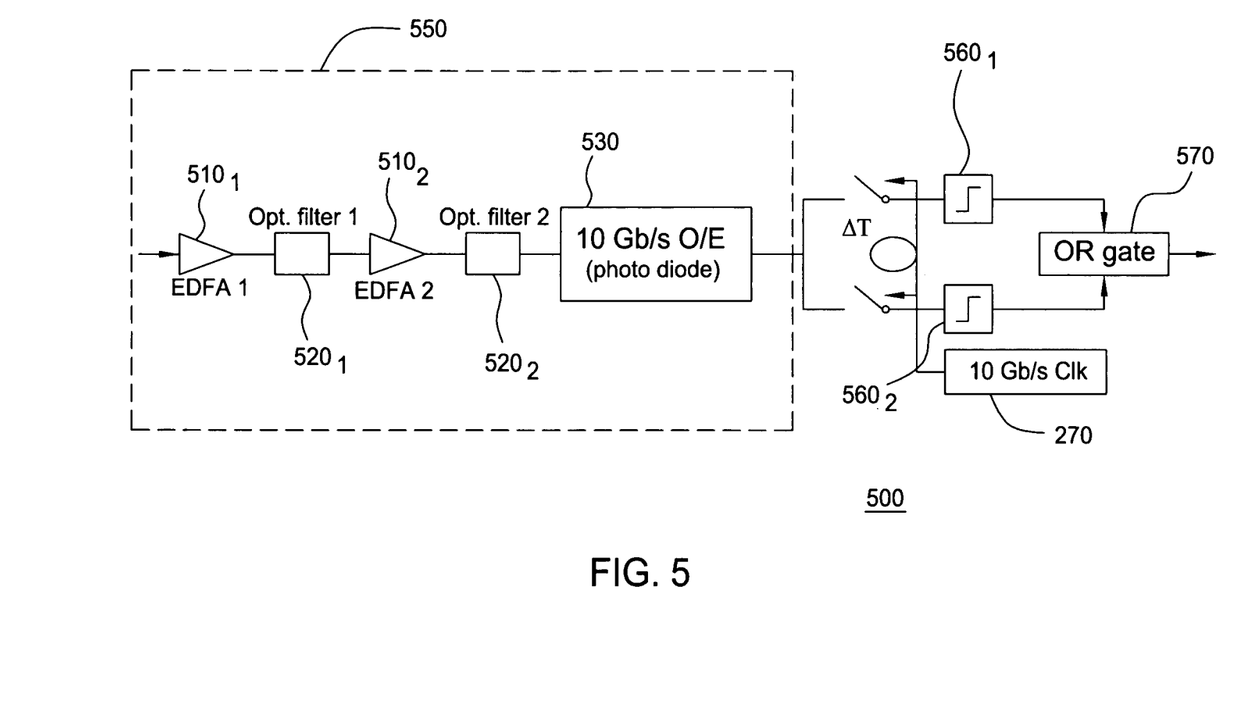
FIG. 5 depicts a high level block diagram of an alternate embodiment of a receiver in accordance with the present invention.

FIG. 5 depicts a high level block diagram of an alternate embodiment of a receiver in accordance with the present invention. The multi-sampling receiver 500 of FIG. 5 comprises a front-end pre-amplified receiver 550. The front-end pre-amplified receiver 550 comprises two erbium doped fiber amplifiers (EDFAs) $510_1$, $510_2$ (collectively EDFAs 510), two optical filters $520_1$, $520_2$ (collectively optical filters 520) and a 10 Gb/s lightwave (electro-optic) converter (illustratively a photodiode) 530. The multi-sampling receiver 500 further comprises two separate decision circuits, $560_1$ and $560_2$ (collectively decision circuits 560), and an OR logic gate 570.

An optical signal is received by the pre-amplified receiver 550 of the receiver 500, wherein the optical signal is converted into an electrical signal. After optical to electrical conversion, the signal is split into two substantially identical versions of the optical signal and launched into the two decision circuits $560_1$, $560_2$. The clock signals of the decision circuits 560 have a phase offset with respect to each other ΔT, which causes the sampling of the optical pulse at two different times. The outputs of the decision circuits 560 are input into the OR logic gate 570. The OR logic gate 570 operates substantially identically to the OR logic gate 160 described above with reference to FIG. 1 and FIG. 2. The decision of the OR logic gate 570 is subsequently output from the receiver 500. As described above with respect to the receiver 160 of FIG. 2, when the outputs of the decision circuits 560 are not NRZ signals, the relative time delay between the two input signals to the OR logic gate 570 must be made substantially zero before entering the OR logic gate 570. This is because if a time delay or an offset between the two input signals entering the OR logic gate 570 is too large, the OR logic gate 570 may have difficulty capturing both pulses within the same time slot. In the multi-sampling receiver 500 of FIG. 5, the optical signal is sampled twice within its bit slot thus improving the jitter tolerance of the receiver 500.

In accordance with the present invention and to further improve the jitter tolerance of a receiver, the electrical signal applied to a decision circuit can be filtered to ensure proper pulse shape of the input signals. Even further, because delays can cause variations in pulse shapes, different filters or filter values can be used to filter the input signals to the decision circuit, each filter chosen to act upon a specific input signal containing a variation in pulse shape due to a delay associated with that input signal.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. An apparatus for improving jitter tolerance, comprising:
a receiver configured to receive an input optical signal and to convert the input optical signal into an electrical signal;
a decision circuit configured to receive the electrical signal from the receiver and to sample the electrical signal at least twice, at two or more different positions, within a bit slot of the electrical signal to provide thereby at least two samples of the electrical signal;
a demultiplexer configured to receive the at least two samples of the electrical signal from the decision circuit and to parallelize the at least two samples of the electrical signal; and
logical OR function circuitry configured to receive at least two of the at least two samples of the electrical signal from the demultiplexer and to determine a resulting logic state of an output signal associated with the input optical signal by processing a combination of the at least two of the at least two samples of the electrical signal.

2. The apparatus of claim 1, wherein the receiver comprises an optical/electrical (O/E) converter configured to convert the input optical signal into the electrical signal.

3. The apparatus of claim 1, wherein the decision circuit is configured to produce a low output signal based on a determination that input power of the electrical signal is below a threshold and to produce a high output signal based on a determination that input power of the electrical signal is above a threshold.

4. The apparatus of claim 1, wherein the decision circuit is configured to provide the at least two samples of the electrical signal based on a converted version of a clock signal associated with the electrical signal.

5. The apparatus of claim 1, wherein the decision circuit is configured to sample the electrical signal four times within the bit slot of the electrical signal to provide thereby four samples of the electrical signal.

6. The apparatus of claim 5, wherein the demultiplexer is a 1:4 demultiplexer.

7. The apparatus of claim 5, wherein the logical OR function circuitry comprises an OR logic gate comprising a first input and a second input, wherein two adjacent center samples of the four samples of the electrical signal are coupled to the first input and the second input, respectively.

8. The apparatus of claim 1, wherein the demultiplexer is a 1:2 demultiplexer, a 1:3 demultiplexer, a 1:4 demultiplexer, or a 1:5 demultiplexer.

9. The apparatus of claim 1, further comprising:
at least one delay device disposed between the demultiplexer and the logical OR function circuitry, the at least one delay device configured to substantially eliminate any relative time delay between the at least two of the at least two samples of the electrical signal.

10. The apparatus of claim 9, wherein the input optical signal is a non-return-to-zero (NRZ) optical pulse.

11. The apparatus of claim 1, wherein the input optical signal is a return-to-zero (RZ) optical pulse.

12. The apparatus of claim 1, wherein the logical OR function circuitry comprises at least one logic device.

13. The apparatus of claim 12, wherein the at least one logic device comprises an OR logic gate.

14. An apparatus for improving jitter tolerance, comprising:
a receiver configured to receive an input optical signal and to convert the input optical signal into an electrical signal;
a splitter configured to split the electrical signal into at least two substantially identical versions of the electrical signal;
at least two decision circuits configured to receive and sample the at least two substantially identical versions of the electrical signal, respectively, to provide thereby at least two samples of the electrical signal, the at least two decision circuits having at least two respective clock signals associated therewith, the at least two clock signals being offset with respect to each other to provide sampling of the at least two substantially identical versions of the electrical signal at different positions within the bit slot of the electrical signal, wherein the at least two decision circuits include four decision circuits configured to produce four samples of the electrical signal; and
logical OR function circuitry configured to receive at least two of the at least two samples of the electrical signal and to determine a resulting logic state of an output signal associated with the input optical signal by processing a combination of the at least two of the at least two samples of the electrical signal.

15. The apparatus of claim 14, wherein the receiver comprises an optical/electrical (O/E) converter configured to convert the input optical signal into the electrical signal.

16. The apparatus of claim 14, wherein, for each of the at least two decision circuits, the decision circuit is configured to produce a low output signal based on a determination that input power of the associated electrical signal is below a threshold and to produce a high output signal based on a determination that input power of the associated electrical signal is above a threshold.

17. The apparatus of claim 14, wherein the logical OR function circuitry comprises an OR logic gate comprising a first input and a second input, wherein two adjacent center samples of the four samples of the electrical signal are coupled to the first input and the second input, respectively.

18. The apparatus of claim 14, further comprising:
at least one delay device disposed between at least one of the at least two decision circuit and the logical OR function circuitry, the at least one delay device configured to substantially eliminate any relative time delay between the at least two of the at least two samples of the electrical signal.

19. The apparatus of claim 18, wherein the input optical signal is a non-return-to-zero (NRZ) optical pulse.

20. The apparatus of claim 14, wherein the input optical signal is a return-to-zero (RZ) optical pulse.

21. The apparatus of claim 14, wherein the logical OR function circuitry comprises at least one logic device.

22. The apparatus of claim 21, wherein the at least one logic device comprises an OR logic gate.

* * * * *